US009887911B2

(12) United States Patent
Pasam et al.

(10) Patent No.: US 9,887,911 B2
(45) Date of Patent: Feb. 6, 2018

(54) SYSTEMS, METHODS, AND DEVICES FOR ADAPTIVE COMMUNICATION IN A DATA COMMUNICATION NETWORK

(71) Applicant: Xaptum, Inc., Chicago, IL (US)

(72) Inventors: Rohit Pasam, Chicago, IL (US); Pradeep Barthur, Chicago, IL (US); Bharat Pasam, Chicago, IL (US)

(73) Assignee: XAPTUM, INC., Chicago, IL (US)

( * ) Notice: Subject to any disclaimer, the term of this patent is extended or adjusted under 35 U.S.C. 154(b) by 0 days.

(21) Appl. No.: 14/193,616

(22) Filed: Feb. 28, 2014

(65) Prior Publication Data

US 2014/0241373 A1 Aug. 28, 2014

Related U.S. Application Data

(60) Provisional application No. 61/770,850, filed on Feb. 28, 2013.

(51) Int. Cl.
*H04L 12/725* (2013.01)

(52) U.S. Cl.
CPC ................... *H04L 45/306* (2013.01)

(58) Field of Classification Search
CPC .................................................... H04L 45/306
(Continued)

(56) References Cited

U.S. PATENT DOCUMENTS 5,410,475 A 4/1995 Lu et al.
5,978,386 A 11/1999 Hamalainen et al.
(Continued)

FOREIGN PATENT DOCUMENTS

EP 0931418 A2 7/1999
EP 1446906 B1 8/2004
(Continued)

OTHER PUBLICATIONS

RFC2543, Mar. 1999.*
(Continued)

*Primary Examiner* — Mark Rinehart
*Assistant Examiner* — Peter G Solinsky
(74) *Attorney, Agent, or Firm* — Garlick & Markison; Timothy W. Markison

(57) ABSTRACT

Disclosed herein are devices, systems, methods, and computer-program products for multiplexing data from multiple transport protocols in computing. Dynamic, reliable, secure and scalable systems and methods are disclosed for onboarding multiple device types onto a network. Novel systems and methods are provided for resolving communication for durable and transient data transfer from multiple device types on a network without requiring software agents, and for mitigating security vulnerability by restricting the operation ports on networks when communicating with multiple heterogeneous device types. Systems and methods described herein provide solutions for dynamically onboarding heterogeneous device types on the network used in pervasive and ubiquitous computing, without requiring software agents on the devices or subscribers. Some solutions encompass systems and methods for multiplexing data from multiple transport protocols using a dynamic dispatcher software assembly that identifies incoming patterns of data for routing to its dynamic reconfigurable corresponding processing logic in the processing module.

20 Claims, 9 Drawing Sheets

(58) Field of Classification Search
USPC .......................................................... 370/400
See application file for complete search history.

(56) References Cited

U.S. PATENT DOCUMENTS

| | | | |
|---|---|---|---|
| 6,097,794 A | 8/2000 | Suffern et al. | |
| 6,430,184 B1* | 8/2002 | Robins | H04L 12/5601 370/392 |
| 6,651,099 B1 | 11/2003 | Dietz et al. | |
| 6,661,431 B1 | 12/2003 | Stuart et al. | |
| 6,667,700 B1 | 12/2003 | McCanne et al. | |
| 6,721,333 B1 | 4/2004 | Milton et al. | |
| 6,859,835 B1* | 2/2005 | Hipp | G06F 9/4843 709/223 |
| 7,120,790 B1 | 10/2006 | LoPresti | |
| 7,319,847 B2 | 1/2008 | Xanthos et al. | |
| 7,590,715 B1* | 9/2009 | Raanan | H04L 41/5058 370/252 |
| 8,073,973 B2 | 12/2011 | McCann et al. | |
| 8,291,058 B2 | 10/2012 | Heat et al. | |
| 8,321,434 B1 | 11/2012 | Ren et al. | |
| 2002/0085575 A1* | 7/2002 | Smith | 370/412 |
| 2002/0176378 A1* | 11/2002 | Hamilton | H04L 12/2602 370/328 |
| 2003/0140140 A1* | 7/2003 | Lahtinen | H04L 12/2602 709/224 |
| 2004/0128552 A1 | 7/2004 | Toomey | |
| 2005/0005145 A1 | 1/2005 | Teixeira | |
| 2006/0092930 A1* | 5/2006 | Shah | 370/389 |
| 2006/0126510 A1* | 6/2006 | Russell | H04L 1/0083 370/235 |
| 2007/0195780 A1* | 8/2007 | Cabeca | H04L 12/4645 370/392 |
| 2008/0115149 A1* | 5/2008 | Rupp | G06F 9/4443 719/318 |
| 2009/0063625 A1* | 3/2009 | Bagepalli | H04L 63/166 709/203 |
| 2009/0070779 A1 | 3/2009 | Wang et al. | |
| 2009/0097506 A1* | 4/2009 | Subrahmanyan | H04J 3/062 370/516 |
| 2009/0168760 A1* | 7/2009 | Katis | H04L 12/1831 370/352 |
| 2009/0199210 A1* | 8/2009 | Smith, Jr. | 719/315 |
| 2009/0222590 A1* | 9/2009 | Van Aken et al. | 709/249 |
| 2009/0323703 A1* | 12/2009 | Bragagnini et al. | 370/401 |
| 2009/0323718 A1* | 12/2009 | Oren-Dahan | H04L 63/029 370/466 |
| 2010/0095367 A1* | 4/2010 | Narayanaswamy | H04L 63/0245 726/12 |
| 2010/0233961 A1* | 9/2010 | Holden | G06F 13/385 455/41.3 |
| 2011/0070868 A1* | 3/2011 | Scholz | H04L 12/5855 455/412.1 |
| 2011/0145181 A1* | 6/2011 | Pandya | G06F 17/30985 706/27 |
| 2011/0228744 A1* | 9/2011 | Cai | H04W 36/0033 370/331 |
| 2011/0264657 A1 | 10/2011 | Hoffman et al. | |
| 2012/0102055 A1* | 4/2012 | Hu | G06F 17/30516 707/754 |
| 2012/0120967 A1* | 5/2012 | Ghiasi | H04L 25/4908 370/464 |
| 2012/0210426 A1* | 8/2012 | Yu | H04L 43/18 726/22 |
| 2012/0253728 A1* | 10/2012 | Chamas et al. | 702/109 |
| 2013/0094451 A1* | 4/2013 | Pavlovski et al. | 370/329 |
| 2013/0136127 A1* | 5/2013 | Hill | H04L 63/0245 370/392 |
| 2013/0304616 A1* | 11/2013 | Raleigh | G06Q 20/145 705/34 |
| 2013/0322626 A1* | 12/2013 | Yang | H04L 63/123 380/255 |
| 2014/0006632 A1* | 1/2014 | Evens | H04L 65/605 709/227 |
| 2014/0028462 A1* | 1/2014 | Lawson | G08C 17/02 340/870.01 |
| 2014/0280829 A1* | 9/2014 | Kjendal | H04L 43/028 709/223 |
| 2016/0119198 A1* | 4/2016 | Kfir | H04L 43/00 709/224 |
| 2016/0210578 A1* | 7/2016 | Raleigh | G06Q 10/06375 |

FOREIGN PATENT DOCUMENTS

| | | |
|---|---|---|
| EP | 1856602 A2 | 11/2007 |
| WO | WO/2000/49481 A2 | 8/2000 |
| WO | WO 0049481 A2 * | 8/2000 |

OTHER PUBLICATIONS

International Search Report corresponding to co-pending International Patent Application Serial No. PCT/US14/19595, United States Patent and Trademark Office, dated Feb. 28, 2014; (4 pages).
International Search Report corresponding to co-pending International Patent Application Serial No. PCT/US14/19595, United States Patent and Trademark Office, dated Feb. 28, 2014; (5 pages).

* cited by examiner

SYSTEMS, METHODS, AND DEVICES FOR ADAPTIVE COMMUNICATION IN A DATA COMMUNICATION NETWORK

CLAIM OF PRIORITY AND CROSS-REFERENCE TO RELATED APPLICATION

This application claims the benefit of priority to U.S. Provisional Patent Application No. 61/770,850, which was filed on Feb. 28, 2013, and is incorporated herein by reference in its entirety.

TECHNICAL FIELD

The present disclosure relates generally to computing systems and data communication networks. More particularly, aspects of this disclosure relate to systems, methods, and devices for transferring information over a data communication network with multiple device types.

BACKGROUND

One of the challenges in pervasive and ubiquitous computing for the foreseeable future is the dynamic onboarding of heterogeneous device types onto computing networks in a method that is reliable, secure, and scalable. This problem can be attributed to heterogeneity in data and in communication protocols with requirements for transient and durable transfer of data to subscribers on the network. Most devices use Internet Protocol (IP) to connect to a communication network. IP, which is the primary network communications protocol used on the Internet, is a Network Layer protocol supported by transport protocols like TCP, UDP and SCTP. Transport protocols with session protocols like HTTP and MQTT are typically the medium for transporting data generated from devices on the network. Devices typically choose to send data in either clear text or binary format. The data can further be encoded in formats such as ASN.1, or can be further encrypted (typically at a packet level). Furthermore, this data can have context that has window of time.

Device data subscribers (e.g., in peer-to-peer or client-server models) typically require device specific software agents that are implemented for resolving communication and data. When a subscriber is communicating with multiple types of devices, for example, the solution for handling heterogeneity is usually solved by developing multiple device-specific software agents on the subscriber device/system. As an alternative, one can also choose to deploy subscriber software agents on each device that converts the communication and data to a format specified by the subscriber. These scenarios do not present a dynamic, reliable, secure and scalable method for onboarding multiple device types onto the network. Further, multiple device specific software agents on the subscriber can create security vulnerability by increasing the number of operational ports in an attempt to accommodate multiple device types.

Devices in pervasive and ubiquitous computing oftentimes communicate in different protocols and data formats to publish/send data to subscribers on a network. As such, subscribers (e.g., peer-to-peer or client-server) are generally required to understand every protocol and data format from the various devices connected to the network. Existing solutions require: (1) subscriber software agents on the device; (2) device-specific software agents on the subscriber; and/or (3) a universal translation software agent on the subscriber that converts all incoming traffic to a specific protocol and data format. New types of devices that are added to the network can require device specific software agents be added to the subscribers. Modifying existing subscriber software and/or developing agents can require significant time, effort, resources, and diligence.

In most if not all of these solutions, software agents are the primary system resource for handling incoming connections, TCP/IP sessions, and managing connections with devices. And, as devices go through their rapid life cycle of upgrades and enhancements, the software agents will also have to be modified and updated at the same rate. The complexity increases further when devices are required to communicate with multiple subscribers on the network, and in scenarios where the subscribers are required to maintain open durable connections for data transfer asynchronously.

SUMMARY

Novel systems, methods and devices are disclosed herein for resolving communication for durable and transient data transfer from multiple device types on a data communication network. In at least some embodiments, these systems, methods and devices eliminate the requirement of software agents (subscriber software or device specific, or both). Some embodiments mitigate security vulnerability by restricting the operation ports on subscribers when communicating with multiple device types. Some embodiments identify patterns of incoming data and connection information for processing and routing processed data, and use regular expression pattern matching and extraction for writing dynamic reconfigurable logic. Some embodiments include configuring and deploying common data communication network services using "service orchestration schemas." Pattern matching, processing and routing can be provided as part of the service orchestration schemas.

Systems, methods and devices are described herein that provide solutions for dynamically onboarding heterogeneous device types on a network used in pervasive and ubiquitous computing, without requiring software agents on the devices or the subscribers. Some solutions encompass a novel method for multiplexing data from multiple transport protocols using a "dynamic dispatcher software assembly" that identifies incoming patterns of data for routing to dynamic reconfigurable processing logic in the processing module. Also disclosed are computer products, such as non-transient machine-readable storage media, which function as middleware for connecting IoT's with enterprise applications. Internet of Things (or "IoT" for short) is a computing concept where everyday physical objects are connected to a computer network (e.g., the Internet) and are able to identify themselves to other objects on the network. Any of the features, aspect and options disclosed in this document can be implemented, singly, collectively, or in any combination, into any of the disclosed embodiments.

Aspects of the present disclosure are directed to a system for dynamically onboarding heterogeneous device types on a data communication network. Some embodiments utilize service orchestration schemas to configure and deploy common data communication network services. The system includes processor logic, a message broker module that is operable to handle incoming connections from different ports and transport protocols, and a message processor module that is communicatively coupled to the message broker module to receive therefrom the incoming connections and transport protocols. The message broker module routs the connection to the message processor module based on a corresponding match rule in the dynamic dispatcher software assembly combined with the incoming destination port and uniquely identifiable incoming connection attributes. The dispatcher software assembly identifies durable or transient data for the message processor module. The dispatcher assembly maintains a connection with devices requiring durable transfer of data for a duration provided in the processor logic. The processor logic, after the duration is complete, flags the message processor module to send a response back to the dispatcher software assembly to close the connection.

Other aspects of the present disclosure are directed to a method for transferring data over a data communication network with multiple device types. The method comprises: routing a connection from a network module to a processing module based on a corresponding match rule in a dispatcher assembly combined with an incoming destination port and uniquely identifiable incoming connection attributes; identifying durable and/or transient data transfer for the processing module; maintaining a connection with devices requiring durable transfer of data for a duration provided in processor logic; and, after the duration is complete, the processor logic flags the processing module to send a response to back to the dispatcher assembly to close the connection. The method may further comprise conducting pattern matching of incoming data with data structure templates provided in service orchestration schemas. The method may also comprise writing dynamic reconfigurable processing logic for identifying patterns of incoming data, and regular expression for incorporating the logic.

In accordance with other aspects of the present disclosure, a method is disclosed for transferring information, over a data communication network (e.g., a computing network), between one or more applications (or "subscribers") and multiple distinct types of devices (i.e., heterogeneous devices). The method includes: communicating with at least one of the devices on the data communication network; multiplexing at least one message received from the at least one device; processing the multiplexed at least one message received from the at least one device utilizing a regular expression pattern; and, distributing the processed at least one message to at least one of the applications on the data communication network.

According to other aspects of the present disclosure, non-transitory machine-readable storage media are featured which include instructions to perform any of the disclosed methods. For example, disclosed herein are one or more non-transitory computer-readable storage media that include instructions which, when executed by one or more processors communicatively connected via a data communication network (e.g., a computing network) to multiple distinct types of devices, cause the one or more processors to perform various operations. These operations include: communicating with at least one of the devices on the data communication network; multiplexing at least one message received from the at least one device; processing the multiplexed at least one message received from the at least one device utilizing a regular expression pattern; and, distributing the processed at least one message to at least one application via the data communication network.

In accordance with other aspects of the present disclosure, a system is described for transferring information, over a data communication network (e.g., computing network), between one or more applications and numerous heterogeneous devices having distinct transport protocols. The system includes various modules which may be stored on one or more servers in a "back-end" computer operating system. The modules include, for example, a network interface module that is operable to communicatively connect with and multiplex messages received from the heterogeneous devices. A dynamic dispatcher module is communicatively coupled to the network interface module, and is operable to persist connection information from the numerous heterogeneous devices. The system also includes a processing module that is communicatively coupled to the dynamic dispatcher module, and is operable to process the multiplexed messages based on logic expressions using regular expression pattern matching. A routing module communicatively coupled to the processing module and the one or more applications, the routing module being operable to determine message distribution information for the processed message and to distribute the processed message to a corresponding one of the one or more applications. Service orchestration schemas may be employed to configure common services on the data communication or computing network.

The above summary is not intended to represent each and every embodiment or each and every aspect of the present disclosure. Rather, the foregoing summary merely provides an exemplification of some of the novel features presented herein. The above features and advantages, and other features and advantages of the present disclosure, will be readily apparent from the following detailed description of representative embodiments and modes for carrying out the present invention when taken in connection with the accompanying drawings and the appended claims.

Figure 1:
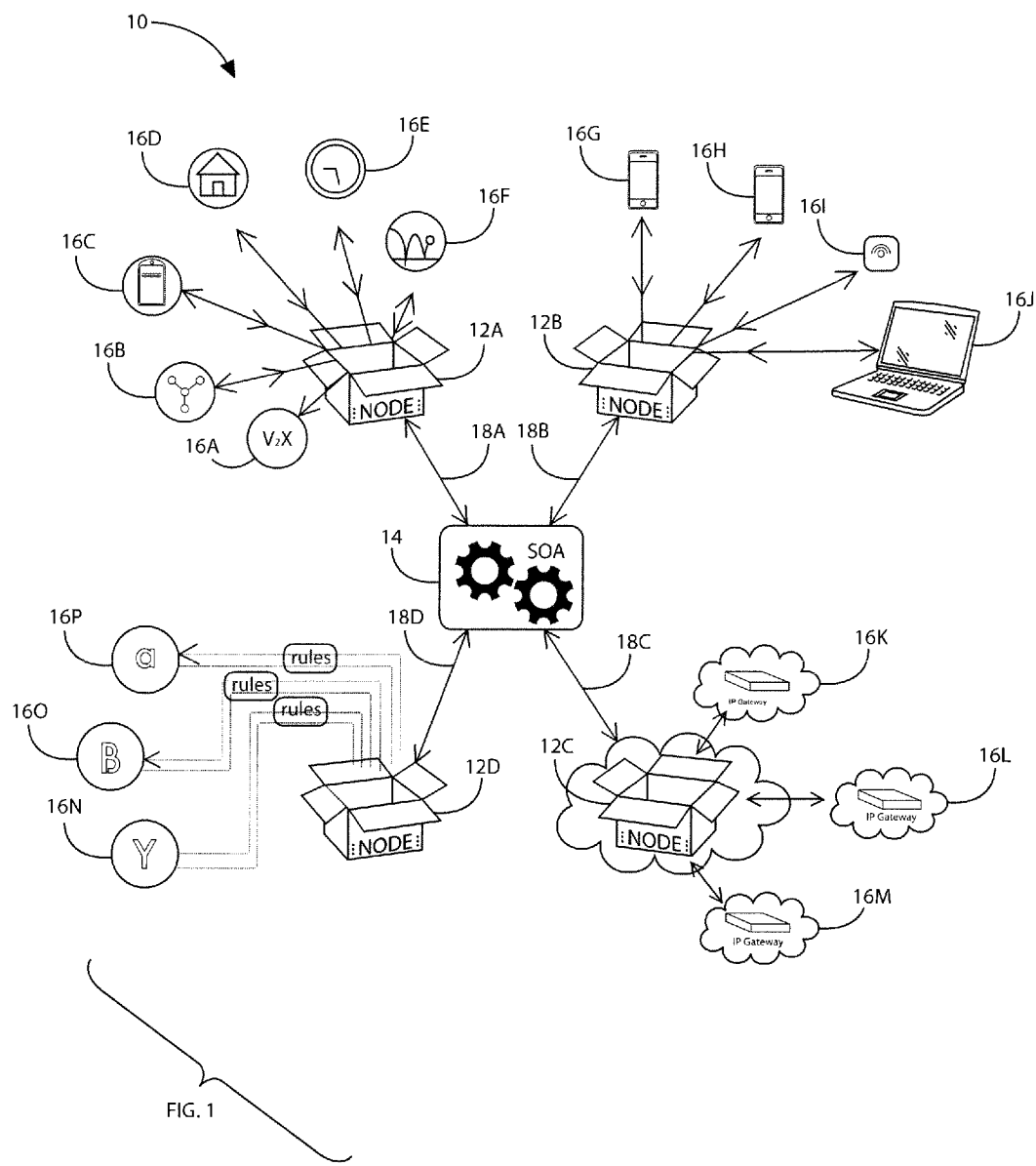
FIG. 1 is a schematic illustration of different functions of middleware configured in accordance with aspects of the present disclosure.

While aspects of this disclosure are susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

This invention is susceptible of embodiment in many different forms. There are shown in the drawings and will herein be described in detail representative embodiments of the invention with the understanding that the present disclosure is to be considered as an exemplification of the principles of the invention and is not intended to limit the broad aspects of the invention to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Systems, methods and devices are described herein that provide a solution for dynamically onboarding heterogeneous devices (e.g., electronic devices of different makes, models, ages, communication ports, and/or transport protocols, etc.) on a data communication network used in pervasive and ubiquitous computing. Some embodiments do not use or require software agents on devices or subscribers. Some embodiments encompass novel systems, methods and devices for multiplexing data from multiple transport protocols using a "dynamic dispatcher software assembly" that identifies incoming data and connection information for routing to a dynamic reconfigurable processing logic in a processing module. When developing solutions for identifying patterns of incoming data for processing, it was determined that the use of regular expression pattern matching and extraction provides an efficient and unexpected use for writing dynamic reconfigurable logic.

As used herein, the word "device" should be given its ordinary and customary meaning accorded by persons of ordinary skill in this art having read and understood this disclosure. For example, "device" can be defined to mean an electronic device, whether it be computing devices, sensing devices, processing devices, etc., with the capacity to perform a function, generate an electrical signal indicative of that function, and communicate that signal to an information network. The word device, as used herein, is inclusive of, but not exclusive to, desktop computers, laptop computers, tablet computers, smartphones, PDA's, electronic tracking devices, such as asset trackers, cargo trackers, and global trackers, electronic detection devices, such as sensors, transducers, and monitors, electronic identification (EID) devices, and the like. In some exemplary applications, a device includes agriculture sensors that measure humidity, soil temperature, and/or soil pH levels for a farm. In some exemplary applications, a device includes automobile tags that are connected through the internet to a central processing system for monitoring performance, running diagnostics, alerting to maintenance problems, etc.

In accord with aspects of the disclosed concepts, there are provided systems, methods and devices which include at least one and, in some preferred embodiments, three software modules: a Network Module, a Processing Module, and Dynamic Configurable Processor Logic. The Network Module represents the transport and session layer in an Open Systems Interconnection (OSI) network model. Transport protocols can constitute both datagrams (connectionless) and streams (connection oriented). At the application layer, the Network Module could require durable transfer of data with sessions. In the case of session-less transfer, the device will typically close the connection after transmitting data.

The Network Module handles incoming connections from different ports and transport protocols, such as TCP, UDP, SCTP, HTTP, MQTT, etc., and forwards information to the Processor Module. The Network Module includes (and in some applications consists of) a "dynamic dispatcher software assembly," which routes incoming connection information and data to the processor logic. Unexpected use of regular expression (RegEX) pattern match engine helps to reduce computing complexity from $O(n^3)$ to $O(n^2)$, making the method scalable with limited computing resources in handling incoming connections. The connection is then routed to the Processing Module based on a corresponding match rule(s) in the dispatcher assembly combined with the incoming destination port and uniquely identifiable incoming connection attributes. Thus, allowing for more than one type of application protocol to share the same port and transport protocol, mitigating security risks associated with having multiple operational ports.

The Processing Module identifies corresponding dynamic reconfigurable processing logic for data processing. To make sure that both durable and transient data transfers are handled uniformly, the dispatcher assembly identifies durable and/or transient data for the Processing Module; this is used with the incoming connection information by the processor logic to manage the incoming connection. The dispatcher assembly maintains the connection with devices requiring durable transfer of data for a duration provided in the dynamic reconfigurable processor logic. After this duration is complete, the processor logic flags the Processing Module to send a response back to the dispatcher assembly to close the connection. The Network Module and the dispatcher assembly, with the foregoing method, can manage application sessions for durable transfer of device data apart from natively managing transport sessions like HTTP/S and MQTT.

Referring now to the drawings, wherein like reference numerals refer to like features throughout the several views, there is shown in FIG. 1 an example of an information communication network, designated generally as 10, with one more representative middleware node(s), which may provide one or more different functions 12A, 12B, 12C and 12D, respectively, for dynamically onboarding heterogeneous devices, multiplexing data from one or more or all of these devices, and routing the data to dynamic reconfigurable processing logic (e.g., provided in Service Orchestration Schema) for processing using regular expression pattern matching and extraction, as will be developed in extensive detail below. A first function or node 12A, for example, is operating as middleware for IoT (Internet of Things), WoT (Web of Things), and M2M (machine-to-machine) services, connecting via a data network 18A with a service oriented architecture (SOA) 14 and any of an assortment of heterogeneous electronic devices. According to the illustrated example, the devices are represented herein by Vehicle-to-Vehicle and Vehicle-to-infrastructure ($V_2X$) devices 16A, Wireless Sensor Network (WSN) devices 16B, Medical Device Data Systems (MDDS) devices 16C, Smart Home devices 16D, Automatic Utility Metering or Advanced Metering Infrastructure (AMI) devices 16E, and telematics devices 16F. By way of comparison, a second function or node 12A is operating as middleware for Mobile Intelligence services, connecting via data network 18B to the service oriented architecture 14 and any of an assortment of heterogeneous mobile electronic devices. The mobile electronic devices are represented herein by a smartphone 16G, a personal digital assistant (PDA) 16H, a WiFi router 16I, and a laptop computer 16J. Operating as middleware for Mobility Data Management, a third function or node 12C is connected via data network 18C to SOA 14 and any of an assortment of heterogeneous electronic devices, which are represented herein by IP Gateway devices 16K for mobile transactions and logistics, IP Gateway devices 16L for remote transactions and geo-location services, and IP Gateway devices 16M for data-in-motion and track-and-trace services. As another example, a fourth function or node 12D is operably configured to provide middleware functionality for providing context to data, which can be based on one or more predefined rule sets. The fourth function/node 12D operates, for example, on a telecommunication service provider network (e.g., AT&T® network) to process information received from real-time applications 16N with autonomous rules, information received from real-time data streams 16O, and information received from real-time behavioral inputs 16P.

Figure 3:
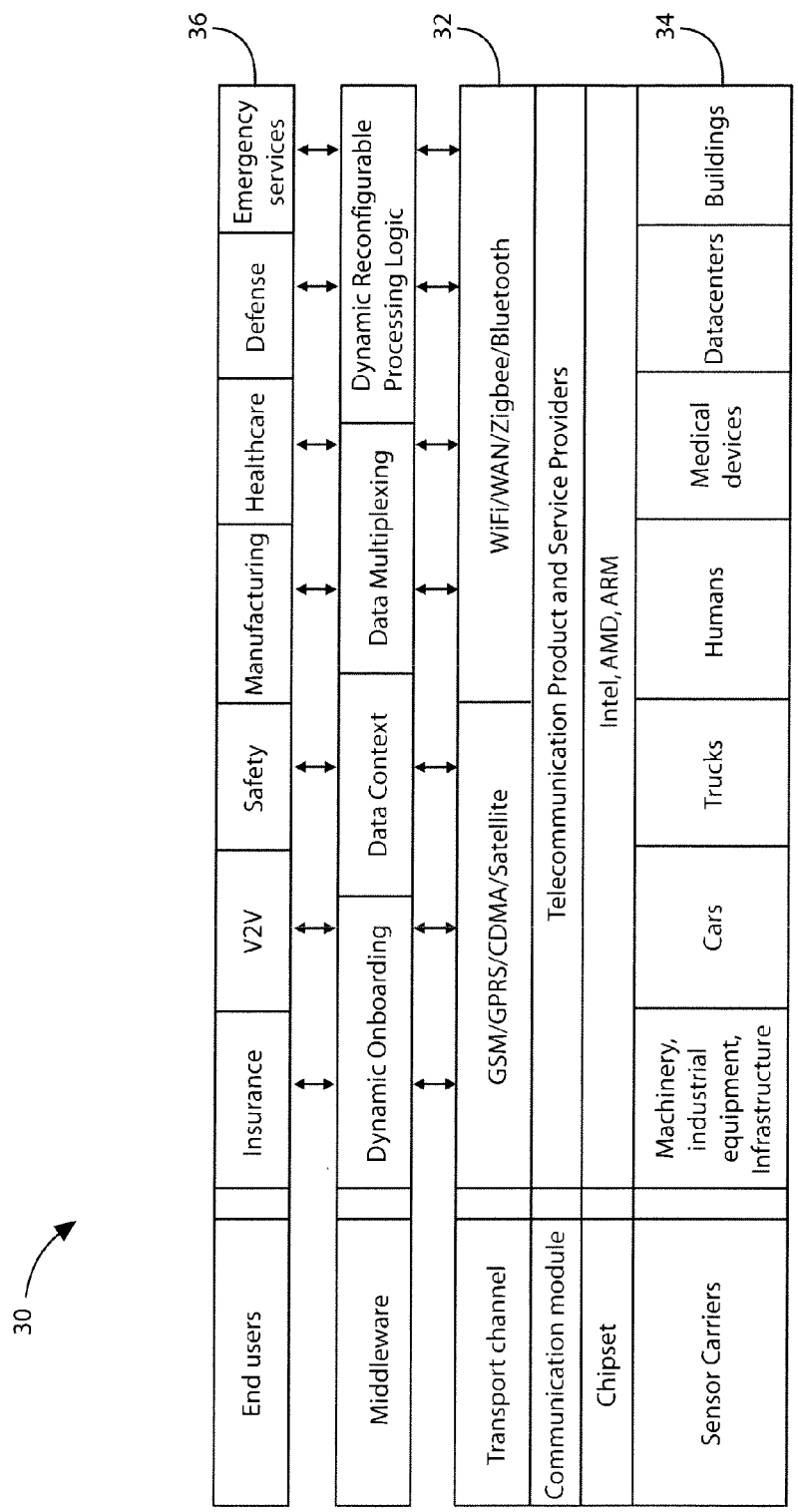
FIG. 3 is a diagrammatic illustration of an example of a computing system in accord with aspects of the disclosed concepts.
Figure 5:
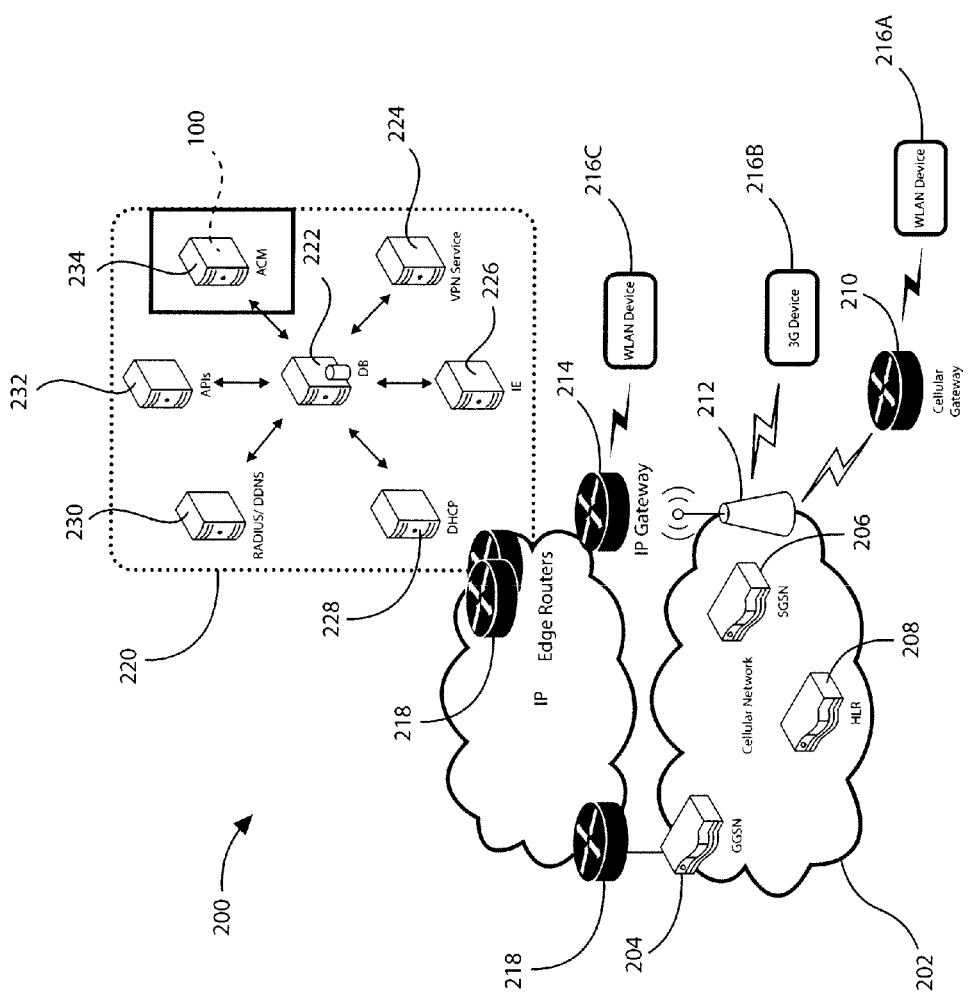
FIG. 5 is a diagrammatic illustration of a representative implementation of the system architecture illustrated in FIG. 4.

It should be readily understood that the system 10 illustrated in FIG. 1, as well as those shown in FIGS. 3 and 5, are provided as some exemplary applications by which the various inventive aspects and features of this disclosure can be applied. For example, the system 10 may comprise fewer or greater functions/nodes (or different functionalities within a node) than the four shown in FIG. 1, each of which may operatively connect with fewer or greater or different devices than that shown in the drawings. Moreover, only selected components of the illustrated systems have been shown and will be described in detail herein. Nevertheless, the systems and devices discussed hereinabove and below can include numerous additional and alternative features, and other well-known peripheral components, for example, for carrying out the various methods and functions disclosed herein.

The communications networks 18A-D of FIG. 1, singly, collectively, or in any combination, can be part of an intranet or extranet, or a combination of the two, and can be a wired or a wireless network, or a combination of wired and wireless technology. Communication can take place through any now-known or hereinafter developed media, such as telephone lines (e.g., Dial-Up), local area network (LAN) or wide area network (WAN) links (e.g., Ethernet, T(X) lines, X.25, etc.), broadband connections (e.g., Integrated Service Data Network (ISDN), Frame Relay, etc.), wireless links (e g, infrared, Bluetooth®, WiFi or WLAN), cellular networks, and so on. The network(s), in at least some embodiments, can typically carry Transmission Control Protocol/Internet Protocol (TCP/IP) protocol communications, and HTTP/HTTPS requests made by devices and associated responses and replies, and the connection between client software and a server can be communicated over such TCP/IP networks. Some non-limiting examples of networks that can serve as the communications networks 18A-D include a wireless or wired Ethernet-based intranet, a local or wide-area network (LAN or WAN), and/or the global communications network known as the Internet, which can be configured to accommodate many different communications media and protocols.

Figure 2:
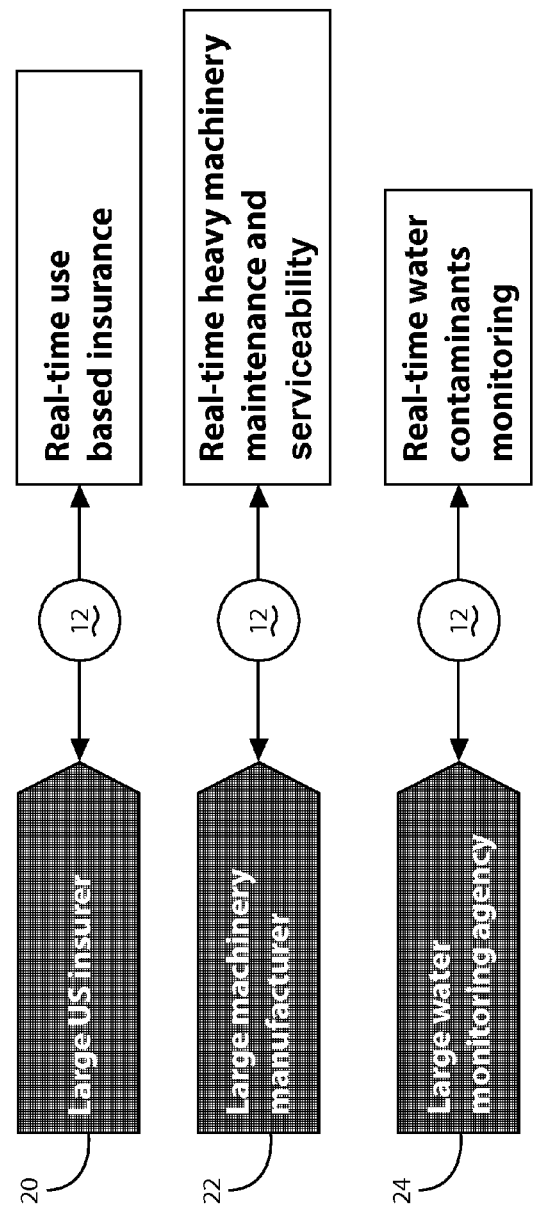
FIG. 2 is a diagrammatic illustration of some representative use cases with exemplary segments and applications implementing one or more of the disclosed solutions according to aspects of the present disclosure.

FIG. 2 illustrates three representative use cases for implementing one or more of the disclosed concepts. In particular, three different users or "applications"—an insurance company 20, a manufacturing company 22, and a utility company 24—utilize middleware 12 that is configured in accordance with the disclosed concepts to realize segment-specific functionality. As shown, the insurance company 20 is able to realize real-time use-based insurance with middleware node 12. Real-time use-based insurance may comprise insurance rates (e.g., automobile insurance premiums) that can be regulated and modified in real-time based upon, for example, the user's driving history, the type of vehicle being used, the amount of time the vehicle is driven, the distance the vehicle is driven, and the location in which the vehicle is driven. With a middleware node 12, the manufacturing company 22 is able to realize real-time machinery maintenance and serviceability. By way of non-limiting example, onboard wireless sensors distribute diagnostic information through the node 12 to a centralized monitoring center which determines if and when maintenance is required. As another example, through a middleware node 12, the utility company 24 is able to achieve real-time water contaminant monitoring and treatment, for example, to ensure clean drinking water that complies with the Federal Safe Drinking Water Act (SDWA).

Turning next to FIG. 3, there is shown an example of a computing system, designated generally at 30, which operates on a digital communication network 32, such as the Internet, a wide area network (WAN), GSM (Global System for Mobile Communications), satellite feed, Bluetooth™, etc., for transmitting information and mining information from data packets. According to the illustrated example, the information is transmitted in the form of discrete, variable sized data packets from numerous heterogeneous devices 34, such as on-board sensors carried, for example, by machinery, automobiles, humans, datacenters, businesses, and the like. As can be expected, the heterogeneous devices 34 use a variety of distinct communication protocols and operational ports. The data packets are multiplexed, indexed, processed and distributed via a middleware component 38 to various applications 36. The applications 36 may include insurance providers, vehicle-to-vehicle (V2V) services, public safety services (e.g., Police, Fire, and EMS), manufacturing and servicing entities, healthcare providers, local and national defense, and emergency services. Like the system 10 shown in FIG. 1, the system 30 is purely representative in nature and should, thus, not be considered to be limiting of the inventive aspects disclosed herein.

Figure 4:
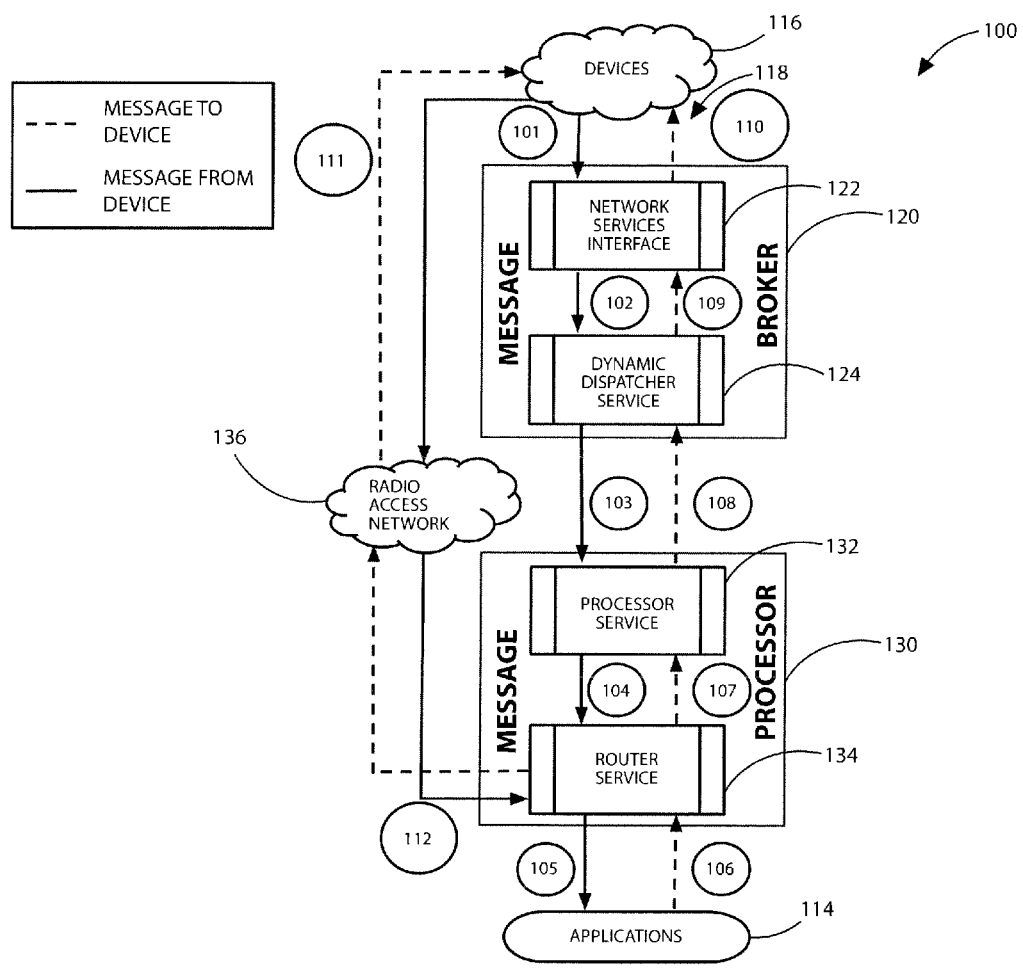
FIG. 4 is a schematic illustration of an example of a system architecture according to aspects of the present disclosure.

With reference next to FIG. 4, there is shown a system architecture 100 for dynamically onboarding heterogeneous devices 116 onto a communication network 118 used in pervasive and ubiquitous computing. While not so limited, the architecture 100 comprises two primary modules: a Message Broker module 120 that is operable to handle incoming connections from distinct devices having different ports and transport protocols, and a Message Processor module 130 that is communicatively coupled to the Message Broker module 120 to receive therefrom incoming connections and transport protocols, and to process data packets using dynamic reconfigurable processing logic. The Message Broker module 120 includes a Network Services Interface (NIS) 122 for brokering messages and connections with devices 116, and for multiplexing messages for transmission to a Dynamic Dispatcher Service 124. The Dynamic Dispatcher Service 124, which is operable for resolving connection status information and persisting connection information, controls message transfers between the Message Broker module 120 and Message Processor module 130. Multiplexed messages and persist connection information is sent from the Dynamic Dispatcher Service 124 to a Processor Service 132 of the Message Processor module 130. The Processor Service 132 extracts and processes data from the multiplexed messages, and establishes destination device information for messages being sent from applications 114 to devices 116. A Router Service 134 distributes processed data from the Message Processor module 130 to one or more applications 140, and brokers messages received from the applications 114.

FIG. 4 is also illustrative of a workflow process for the system architecture 100 when operating as Adaptive Communication Middleware (ACM). For such operability, the system architecture 100 might exist as non-transient computer-readable software on a back-end server in an Operating System of a subscriber. At step 101, the Message Broker module 120, via Network Services Interface (NIS) 122, brokers message(s) and connection(s) from heterogeneous devices 116, and either holds a connection on port if required or disconnects a connection on port if required. The NIS 122 might hold or disconnect a connection on port by issuing an instruction to the Operating System using connection handling libraries. Connection handling libraries are programming libraries that are provided, for example, by the Operating System with instructions for accessing its computing resources—in this case, how to handle connections to ACM software. Software that is developed and deployed on this Operating System can use these programming libraries to incorporate and customize Operating System functionalities to the software's requirement(s). Connections are used by the Operating System to initiate a communication link with the device(s) 116 on the network 118, and vice versa. Once the message has been sent, the connection is typically disconnected. However, in some scenarios, a connection has to hold for a predetermined or "sustained" period of time, as there could be several request response messages that are exchanged between the device and Operating System. A connection can be held even after the message is sent, for example, if a device 116 is expecting some response from the system architecture 100 to complete the message sending process. Below are some examples of different possible combinations:

A. Device opens connection, sends message, and then disconnects.
B. Device opens connection, sends message, holds connection, receives response, and then device disconnects once receives response.
C. Device opens connection, sends message, holds connection, system disconnects after it sends response.

At step 102, the Message Broker module 120, via NIS 122, will multiplex message(s) from NIS ports to the Dynamic Dispatcher Service 124. Oftentimes, messages that are transmitted from heterogeneous devices 116 arrive in the Message Broker module 120 using different transport protocols and having different data structures. Unlike prior art solutions, all of these messages are processed using a common processing service, namely Processor Service 132, as will be discussed in further detail below. This common processing service is dynamically configured using service orchestration schemas and/or patterns to identify the processing and routing requirements of arriving messages from different types of devices. These aforementioned schemas/patterns are generated, for example, by users who connect their devices to the system architecture 100 for routing messages to and from their applications 114. A schema is an organized "memory map" or pattern of data, processes, routes, services, and computing resources for a set of devices. Once a message arrives in the system architecture 100, it identifies the matching service orchestration schema and executes (or orchestrates) the system architecture 100 services for that message as determined by the schema. For the configuration and deployment of common network services, the service orchestration schemas may provide for sensing, synchronization, identification and control, relationship, and context, all of which are device attributes. An example of service orchestration schema includes:

{"accountId":1,"id":1, "logicExpression":
"(?<m_imei>.+?),(?<VAL>.+?)","name":
"Test Object Type","networkid":1,"networkTransportId":1,
"processorId":1}

Device group functions are captured in the service orchestration schema. Services are orchestrated on the data communication network in relation to these functions. An example of context service orchestration schema includes:

{"accountId":1,"connectedObjectTypeId":1,"
createdBy":"admin",
"id":1,"name":"google car","text":<context>
<operator>EQ</operator> <lhs function =
\"LOG\">Pin4</lhs> <rhs>ON</rhs> <event
code = \"EC-ON\">Event ON Text</event>
</context>"}

With continuing reference to FIG. 4, the system architecture 100, namely Dynamic Dispatcher Service 124, will persist connection information from a communicatively coupled device(s) 116, if required, and concomitantly send multiplexed message(s) to the Processor Service 132, at step 103. Persist connection information generally comprises storing connection details (e.g., the remote IP address, connecting port, etc.) of a device that is connecting to the Operating System via system architecture 100. This is typically required, for example, if the system architecture 100 is going to hold a connection with the device, and/or to send back a message the device might be expecting after processing the device's message, and/or sending one or more messages to the device that were pending for the device in the system architecture 100 and could not be delivered directly (in devices which do not have direct IP reachability).

In step 104 of FIG. 4, the Processor Service 132 receives a message(s) from the Dynamic Dispatcher Service 124, indexes the message(s) in a common format, extracts data from the device message(s), processes the message(s) based on logic expression in configuration schema (i.e., orchestration schemas) of the message(s), and sends the formatted message(s) to the Router Service 134. By way of non-limiting example, after a message is received and indexed by the Processor Service 132, the metadata in the indexed message is used to identify the schema of the message and the processing requirements of the message. The logic expression, which is part of the service orchestration schema, uses regular expression(s) to match name groups that are to be extracted and processed as per the schema's processing logic. The other information in the service orchestration schema may provide details on the account, the network, and assigned processor for the group of devices using this schema. In general, the aforementioned service orchestration schemas can define configured data processing requirements (XML is an example), and may further provide a means of configuring data and computing resources to meet the requirements in a product space.

Logic expression provides a means of processing messages using regular expression analysis. A "regular expression" (or "RegEX" for short) is a sequence of characters arranged in a special search string that forms a search pattern for use, e.g., by a regular expression engine or processor, in pattern matching with strings of input text. The regular expression engine/processor processes a regular expression search string, or "statement," which is articulated in a given formal language, and with that examines an input "target" text string, typically parsing the target text string to identify substrings. Implementing logic expression processing in the manner indicated above may therefore require writing dynamic reconfigurable logic for identifying patterns of incoming data from the multiple distinct types of devices on the computing network, and identifying patterns of incoming data from the multiple distinct types of devices on the computing network for matching the incoming data with one or more data structure templates (e.g., a data structure used as a format for other data structures).

Regular expression analysis can be used to extract useful information from massive amounts of data for later data manipulation. For some implementations, the regular expressions can be similar to the Java RegEX Flavor, but are typically not restricted to the limits of this specific flavor and will generally have extra features (e.g., different named groups with the same name in one regular expression). As one illustration of regular expression, one or more devices are integrated into an automobile and monitor a group of pre-specified parameters, such as the car's speed, current odometer and/or trip reading, and the percentage of remaining battery life. The device(s) transmits messages, for example, every five minutes with the following format:

(car ID),(speed),(distance traveled),(battery life)@@

So, an example of a message with this format could look like this:

92384731,45,3217,89%@@

Knowing the order of these values—car ID is first, car speed is second, etc., a regular expression is written to extract one or more or all of these values from incoming messages from the device(s). First thing that is typically considered is which part or parts of the message need to be extracted. Generally speaking, it is not desired to extract the hashtag symbols "##" or the ampersand symbols "@@" because they do not provide meaningful information; these characters are merely used to delimit messages from one another. Rather, it may be desirable to extract data from one or more of the four fields—(1) the car ID, (2) the car speed, (3) the distance traveled, (4) the battery state/life. In the exemplary message set forth above, all of these fields are delimited with commas. Having considered the above, our regular expression will typically start with "##" and end with "@@" to match the messages, and utilize commas in between the values that should be extracted. For every parameter that should be extracted, the following regular expression format can be used:

(?<name of parameter>.+?)

Using the foregoing format, a complete regular expression that matches the above sample messages can be written like the following:

(?<carID>.+?),(?<Speed>.+?),(?<Distance>.+?),
(?<Battery>.+?)@@

By way of comparison, a device message may start with a single ampersand "@" symbol and end with three less-than "<" symbols, rather than start with two hashtag "#" symbols and end with two ampersand "@" symbols. Furthermore, the message may include an additional parameter that displays the temperature of the engine. In addition, the delimiting character used to delineate values might be an underscore "_" rather than a comma ",". In this case, the message may look like this:

@92384731_45_3217_89%_200<<<

From our previous examples, the regular expression can be modified to look like the following:

@(?<carID>.+?)_(?<Speed>.+?)_(?<Distance>.+?)_
(?<Battery>.+?)_(?<TEMP>.+?)<<<

Generally speaking, the format of each regular expression can, more or less, look the same—i.e., there are one or more characters at the beginning of the expression, one or more characters at the end, and one or more fields with data that we name and delimit with one or more characters.

For some implementations, there are specific characters that cannot be added "as is" on the regular expression. These specific characters, which can be presented in a list of specific characters, can require an escape sequence when added to a regular expression. For example, these characters can require a single backward slash "\" before being added to a regular expression. There are also some characters called escape sequences, which can be presented in a list of escape sequences, that likewise cannot be added "as is" on the regular expression. For these characters, two backward slashes "\\" may be required before adding the escape sequence to a regular expression. For instance, the dollar sign "$" can be designated as a special character, while the newline "\n" character can be designated as an escape sequence. If the incoming messages always end with a dollar sign character "$" and a newline character "\n", the regular expression will be written with "\$" and \\n, instead of just "$" and "\n". So, an example of such a message may look like this:

92384731,45,3217,89%$\n while a regular expression that matches this example can be written as:

(?<carID>.+?),(?<Speed>.+?),(?<Distance>.+?),
(?<Battery>.+?)\$\\n

Some devices will send messages with a large number of parameters; it may be desired to extract only a select parameter or a select subset of the available parameters. For the parameters that will not be extracted, the designation "(?<name of parameter>.+?)", which was used in the above regular expression examples to identify parameters for extraction, is replaced with ".+?" without opening and closing parentheses. Returning to the above automobile example, if might be desired that only the carID and the speed be extracted. So, instead of placing all of the parameters in the regular expression as follows:

(?<carID>.+?),(?<Speed>.+?),(?<Distance>.+?), (?<Battery>.+?)@@ each of the parameters that should be omitted will be replaced with ".+?," for example:

(?<carID>.+?),(?<Speed>.+?),.+?,.+?@@

As can be expected, there will be application scenarios where a device or a group of devices transmit more than one type of message to the system. For example, suppose an automobile with (or acting as) one or more devices sends a first type messages, each of which contains the carID, the battery state/life, and the engine temperature (MessageType1), and a second type of messages, each of which contains the carID, the current speed, and the distance traveled (MessageType2). Advantageously, the sequence and timing in which the messages arrive on the system are not problematic. All that is required, for example, is to write a regular expression for each type of message and link them together, for example, with the pipe character "|". For an example where three messages are transmitted to the system, such as:

92384731,89%,200@@##92384731,52,2173@@##92384731,88%,204@@

Message 1     Message 2     Message 3

A regular expression solution can take on the following form:
(?<carID>.+?),(?<Bat>.+?),(?<Temp>.+?)@@|## (?<carID>.+?),(?<Speed>.+?),(?<Dist>.+?)@@

Some general steps that can be used to create a regular expression include: first, distinguish which parts of a message should be extracted, and which parts of the message should not be extracted; second, consider what are the delimiting patterns for the messages and what are the values within a message; third, determine if any of the patterns contain specific characters that require escape sequences to be used; and, fourth, write a regular expression based on factors considered in the steps above.

When a device, such as a diagnostic sensor or an agriculture sensor, sends information to an application via the system architecture 100, the Message Processor module 130 utilizes regular expression analysis, rather than writing a service agent, to understand the data sent by the devices. In addition, step 104 provides a way to monitor if the system architecture 100 has a direct connection to the device to deliver messages, thus avoiding the need for a dedicated channel, such as SMS (Short Messaging Service), which can be unreliable.

Each regular expression is typically common across a product of devices. For example, a specific type of smartphone will communicate with the system architecture 100 using the same type of transport protocol and data format of messages. So that type of smartphone, with different users, is going to send a similarly formatted set of messages. In this example, a regular expression will be generated for that type of device, all of which belong to a particular category. A different smartphone manufacturer, on the other hand, might configure a model of smartphones to send messages in a different format. Consequently, a distinct regular expression will be generated for this type or of device.

With reference again to FIG. 4, step 105 comprises distributing processed device message(s) to one or more of the applications 114. In some embodiments, a message that is received via the Router Service 134 is distributed from the Message Processor module 130 to different subscribing applications. As indicated above, an example includes automobile sensors sending messages to the system architecture 100, such as engine, battery, and safety system data, and the system architecture 100, after processing the messages accordingly, distributes predefined segments of this data to several service station applications and the car manufacturer.

A variety of optional steps that can also be carried out by the system architecture 100 is also presented in FIG. 4. For instance, step 106 includes receiving from one or more of the different subscribing applications 114 one or more messages for one or more of the devices 116. Continuing with the above automobile example, a subscribing application (e.g., a local service station) wants to send a message—e.g., "what is current engine temperature?" to an onboard device of a car. This message is sent by an application 116 to the Router Service 134 of the Message Processor module 130, and the system architecture 100 then determines how to deliver the message and in what format to deliver the message. Typically, the user provides the delivery formats as message templates, which are part of the aforementioned schema.

Contemporaneous with or subsequent to step 106, when the Router Service 134 receives one or more application messages from the different subscribing applications 114, a message destination of a destination device is determined at step 107. Step 107 may further comprise determining a method of delivery with destination device schema for the destination device. In some embodiments, the message destination is determined by parsing each message received from the applications 114 to determine the schema with which the message is associated. The Router Service 134 can identify from the schema how to deliver the message to the destination device.

In step 108, the Processor Service 132 of the Message Processor module 130 determines the connection state of the destination device and processes the application message(s) intended for the destination device. Connection status information can be determined, for example, by querying the persisted connection database (e.g., information that was collected by the Dynamic Dispatcher Service 124 in step 103). If there is a persisted connection, the connection state is connected; if there is no persisted connection and the device is not available, the connection state is disconnected. Step 108 provides a new way of using schemas to configure how a set of devices interact with the system architecture 100, and using logic expression to dynamically configure how a message has to be processed.

Once the connection state of the destination device is confirmed, Dynamic Dispatcher Service 124 performs step 109, whereat all of the application messages for an intended device are sent to the NIS 122 with connection details for the destination device(s). The connection details may include whether there is a persisted connection, a need for a request to open a new connection, or an active incoming connection form the device. The persisted connection information, or a request to open a new connection, is sent to NIS 122 with the message payload formatted in a way that that the destination device(s) can understand the message. At step 110, the Message Broker module 120, via Network Services Interface (NIS) 122, brokers message(s) and connection(s) with the destination device(s) 116, and either holds a connection on port if required or disconnects a connection on port if required.

FIG. 4 also illustrates alternative means with which the devices 116 and applications 114 can exchange information—e.g., Radio Access Network 136. In accord with this example, at step 111, one or more user application(s) 114 employ alternate message delivery means, such as GSM, SMS, or similar radio access networks 136, to deliver messages to destination device(s) 116. Likewise, at step 112, the heterogeneous devices 116 employ alternative message delivery means—Radio Access Network 136—to deliver messages to user application(s) 114. In some embodiments, the Router Service 134 of the Message Processor module 130 regulates transmissions via the Radio Access Network 136, as indicated below with respect to FIG. 9. Further clarification of steps 111 and 112 can be garnered by reference to FIG. 5 and the corresponding discussion below.

FIG. 5 portrays a representative implementation of the system architecture 100 of FIG. 4, shown deployed on a wireless operator infrastructure, such as a general packet radio service (GPRS) core network, which allows 3G, 4G, GSM and WCDMA networks to transmit IP packets, for example, to the Internet. In particular, this illustration presents an actual use of the system architecture 100 in the field with cellular as the Radio Access Network 136. Devices that use cellular radio (e.g., a car) and devices that use WLAN or WiFi (e.g., a smart refrigerator) can send data to the system architecture 100 for processing and transmission to corresponding applications, and can receive messages from their applications via the system architecture 100.

The system 200 of FIG. 5 comprises a cellular radio network 202 with a Gateway GPRS Support Node (GGSN) 204, or any gateway node, which operates as a router for "internetworking" between the network 202 and external packet switched networks, like the Internet. The GGSN 204 forwards data to a Serving GPRS Support Node (SGSN) 206 serving the user. GPRS Tunneling Protocol can be employed to carry subscriber data from the subscriber's current SGSN 206 to the GGSN 204 which is handling the subscriber's session. The network 202 further comprises a Home Location Register (HLR) 208, which operates as a centralized or main database that contains subscriber information—details of each mobile subscriber that is authorized to use the cellular network 202. Through data packet transmission with a wireless tower 212, various devices, such as a WLAN Device 216A and a 3G Device 216B (by way of a Cellular Gateway 210), communicate with the cellular network 202.

The cellular network 202 exchanges information with a user's host server system 220 via IP edge routers 218. Optionally, one or more devices, such as WLAN device 216C, exchange information with the user's host server system 220 by transmitting data through IP Gateway 214 (as opposed to going through the network 202). The host server system 220 comprises a central database 222 that is operably coupled to a Virtual Private Network (VPN) Service 224, an Inference Engine (IE) 226, a Dynamic Host Configuration Protocol (DHCP) server 228, a Remote Authentication Dial-In User Service (RADIUS) and Dynamic Domain Name Service (DDNS) server 230 and an Application Programming Interface (API) 232. The system architecture 100 operates as Adaptive Communication Middleware (ACM) on ACM server 234 in the user's host server system 220.

Figure 6:
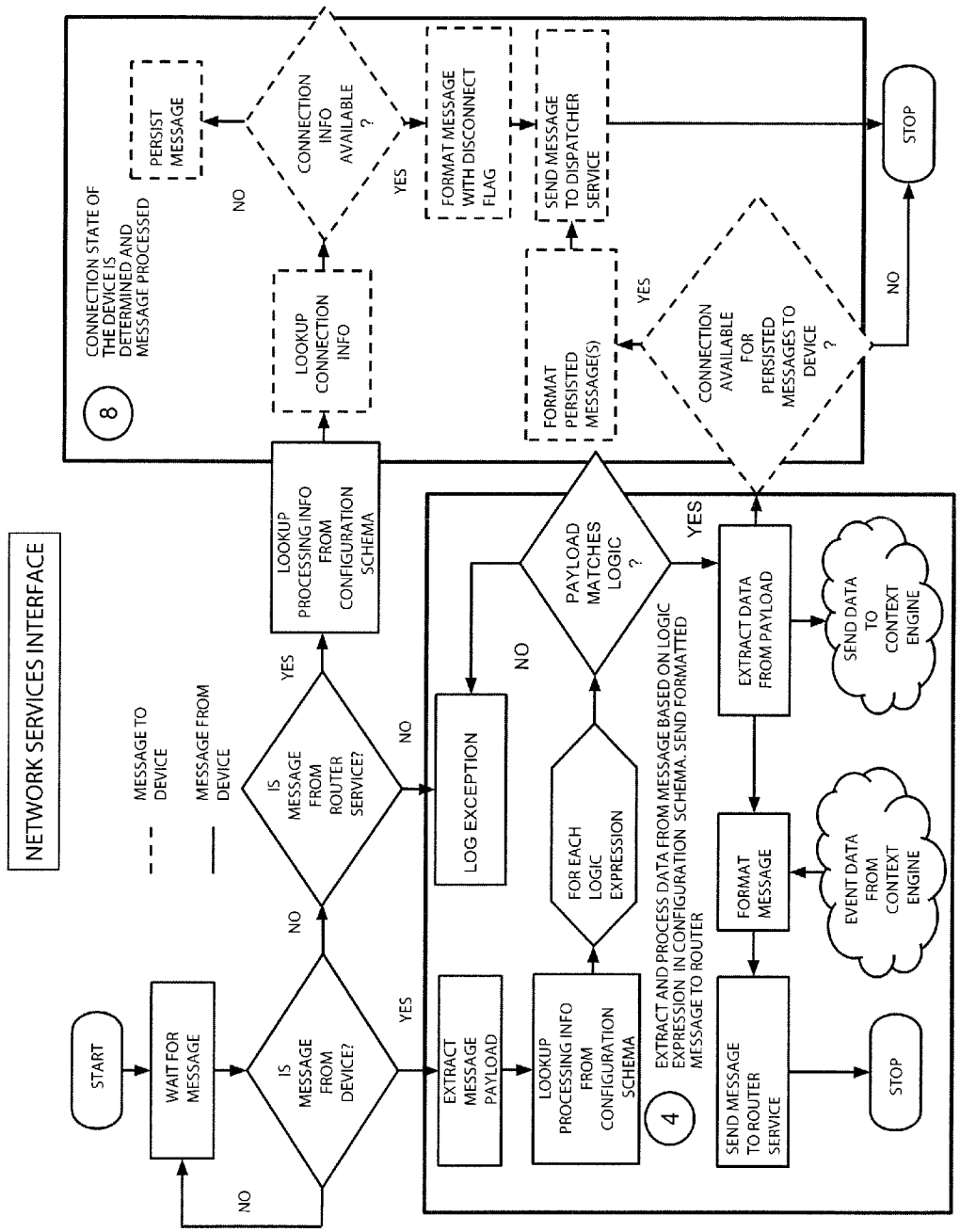
FIG. 6 is a flowchart for an exemplary network services interface module and corresponding method or algorithm that can correspond to instructions that can be stored on one or more non-transitory computer-readable media and can be executed by one or more controllers and/or processors which may be part of a computing network in accord with aspects of the disclosed concepts.

With reference now to the flowchart of FIG. 6, an improved method for brokering messages and connections with devices, and for multiplexing messages, is generally described at 300 in accordance with aspects of the present disclosure. FIG. 6 can be representative of an algorithm that corresponds to at least some instructions that can be executed, for example, by the Network Services Interface (NIS) 122 of the Message Broker module 120 of FIG. 4 to perform the corresponding above- and below-described functions associated with the disclosed concepts. This flowchart helps to illustrate the NIS service 122 that interacts with device(s) on the network, manages connections to the device, and executes connect and disconnect procedures.

At step 301, the method 300 includes waiting for a message from a device or an application. Once a message is received by the NIS 122, step 303 includes determining if the received message is from a device. If the received message is from a device (i.e., 303=YES), the method 300 responsively continues to step 305, where the message is forwarded to the Dynamic Dispatcher Service 124, and contemporaneously step 307, where the Message Broker module 120, by way of the NIS service 122, either holds a connection on port if required or disconnects a connection on port if required. Multiplexing messages from different protocols, as described above with reference to FIG. 4 and below with reference to FIG. 6, provides a way to accept messages from heterogeneous devices with different protocols, and forward these messages to a common dynamically configurable message processor. This helps limit the number of ports required to communicate with many distinct types of devices.

If the message received by the NIS 122 is not from a device (i.e., 303=NO), the method 300 responsively continues to step 309, where it is determined if the received message is intended for transmission to a device (e.g., an application message forwarded by the Dynamic Dispatcher Service 124). If not (i.e., 309=NO), the method 300 returns to the beginning and the NIS 122 waits for a message. If the received message is intended for transmission to a device, the method 300 continues to step 311 where it is determined if a connection ID is available. If a connection ID is available (i.e., 311=YES), the method 300 responsively proceeds to step 313, where the connection information for the destination device is determined, and then step 315, where the message is sent to the destination device. If a connection ID is not available (i.e., 311=NO), the method 300 responsively proceeds to step 317, where the NIS 122 will initiate a new connection with the device, and then step 315, where the message is sent to the destination device. Once the message is sent, the method 300 moves to step 319 where the NIS 122 will hold or disconnect the connection on port. The method 300 may then return to step 301.

Figure 7:
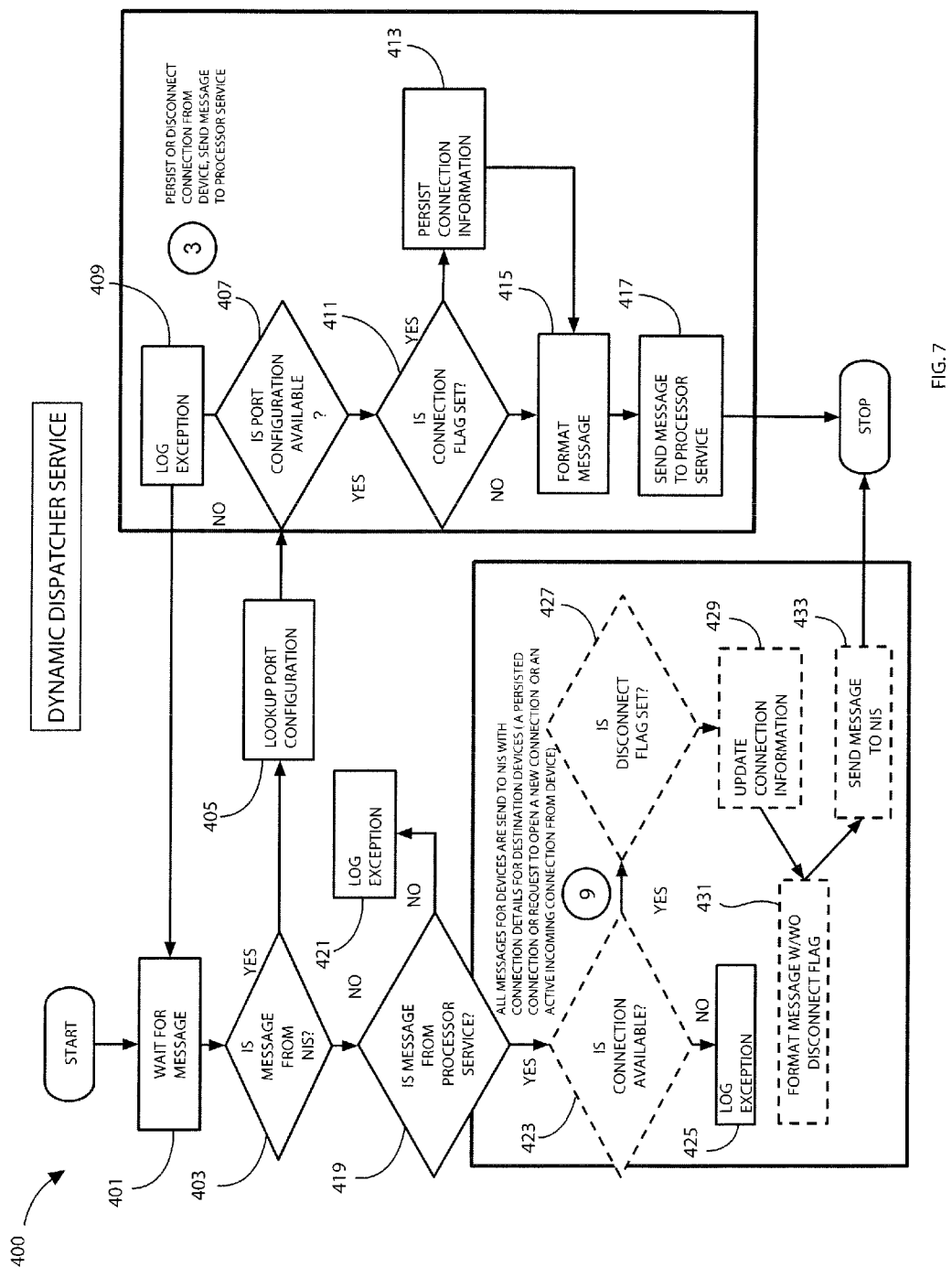
FIG. 7 is a flowchart for an exemplary dynamic dispatcher service module and corresponding method or algorithm that can correspond to instructions that can be stored on one or more non-transitory computer-readable media and can be executed by one or more controllers and/or processors which may be part of a computing network in accord with aspects of the disclosed concepts.

With reference now to the flowchart of FIG. 7, an improved method for resolving connection status information and persisting connection information is generally described at 400 in accordance with aspects of the present disclosure. FIG. 7 can be representative of an algorithm that corresponds to at least some instructions that can be executed, for example, by the Dynamic Dispatcher Service 124 of the Message Broker module 120 of FIG. 4 to perform the corresponding above- and below-described functions associated with the disclosed concepts. This flowchart helps to illustrate the details on how multiplexed messages are processed by the Dynamic Dispatcher Service 124. This Dynamic Dispatcher Service 124 provides a way to asynchronously handle (persist/open/disconnect) connections to and from devices, which helps to know the connection state of a device with the system architecture 100.

At step 401, the method 400 includes waiting for a message from the NIS 122 or the Processor Service 132 of the Message Processor module 130. Once a message is received by the Dynamic Dispatcher Service 124, step 403 includes determining if the received message is from NIS 122. If the received message is from NIS 122 (i.e., 403=YES), the method 400 responsively continues to step 405, where the Dynamic Dispatcher Service 124 determines the port configuration. In this regard, the method 400 determines at step 407 if the port configuration is available. If not (i.e., 407=NO), a log exception is issued at step 409, which may include creating an unexpected message record, since the service received an unexpected message. The method 400 then returns to step 401 to wait for a message.

If the port configuration is available (i.e., 407=YES), the method 400 of FIG. 7 responsively continues to step 411, where the Dynamic Dispatcher Service 124 determines if a connection flag is set. If the connection flag has been set (i.e., 411=YES), the system architecture 100, namely Dynamic Dispatcher Service 124, will responsively persist connection information from a communicatively coupled device(s) 116 in the manner described above, as indicated at step 413. Once step 413 is complete, the message is formatted by the Message Broker module 120 at step 415, and concomitantly sent to the Processor Service 132 of the Message Processor module 130, as indicated at step 417.

Returning to step 403 of FIG. 7, if the message received by the Dynamic Dispatcher Service 124 is not from NIS 122 (i.e., 403=NO), the method 400 continues to step 419, where it is determined if the received message is from the Processor Service 132. If the message is not from the Processor Service 132 (i.e., 419=NO) or from NIS 122 (i.e., 403=NO), a log exception is generated at step 421. If, however, the message is from the Processor Service 132 (i.e., 419=YES), the method 400 responsively continues to step 423 where the Dynamic Dispatcher Service 124 determines if a connection is available for the destination device. If no connection is available, (i.e., 423=NO), a log exception is generated at step 425. If a connection is available for the destination device (i.e., 423=YES), the Dynamic Dispatcher Service 124 will respond by determining if a disconnect flag is set, at indicated at step 427, and then updating connection information, as indicated at step 429. Once the connection information is updated, the message is formatted with or without a disconnect flag at step 431, and the formatted message is sent to NIS 122 at step 433. The method 400 may then return to step 401.

Figure 8:
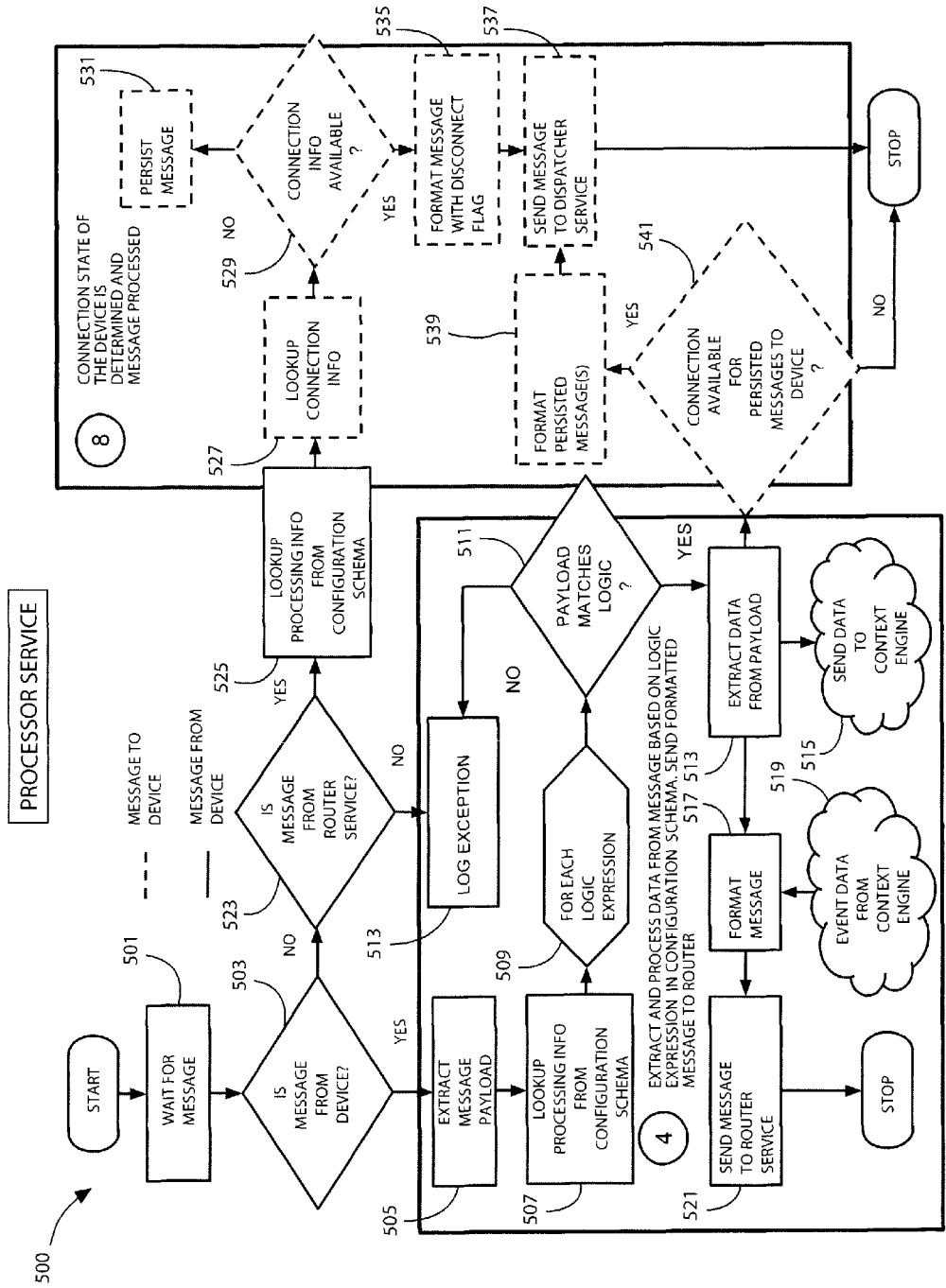
FIG. 8 is a flowchart for an exemplary processor service module and corresponding method or algorithm that can correspond to instructions that can be stored on one or more non-transitory computer-readable media and can be executed by one or more controllers and/or processors which may be part of a computing network in accord with aspects of the disclosed concepts.

With reference now to the flowchart of FIG. 8, an improved method for indexing messages, extracting data from the indexed messages, and processing the messages based on logic expression in configuration schema of the messages, is generally described at 500 in accordance with aspects of the present disclosure. FIG. 8 can be representative of an algorithm that corresponds to at least some instructions that can be executed, for example, by the Processor Service 132 of the Message Processor module 130 of FIG. 4 to perform the corresponding above- and below-described functions associated with the disclosed concepts. This flowchart helps to detail the steps in how the Message Processor module 130 of the system architecture 100 processes the messages exchanged by the devices and applications.

The method 500 begins at step 501 where the Processor Service 132 waits for a message to arrive for processing. Once a message is received by the Processor Service 132, step 503 includes determining if the received message is from a device, i.e., by way of the Dynamic Dispatcher Service 124. If the received message is from a device (i.e., 503=YES), the Processor Service 132 responsively extracts the message payload (i.e., the message body/data content), as indicated at step 505. At step 507, the method 500 then requires that the Processor Service 132 determine the processing information for that message from the message's configuration schema. Device identification, device group, network, account, and processor ID are all examples of processing information that can be included in and retrieved from the configuration schema.

At block 509, the proper logic expression routine is initialized. Once initialized, the Processor Service 132 determines, at step 511, if the payload matches the logic. If not (i.e., 511=NO), a log exception is responsively generated at step 513. For example, when processing a message, it is known that the message should belong to an account and a device-type group; as such, if there is no match, the system will log a record indicating an unexpected message from device. If the payload does match the logic (i.e., 511=YES), the method 500 continues to step 513 where the Processor Service 132 extracts the necessary data from the payload, and the extracted data is sent to a context engine at 515. The message payload is parsed and parameters provided in the logic expression are extracted and formatted for the application. The method 500 then continues to step 517 where the Processor Service 132 formats the message and, in some scenarios, receives event data from the context engine at 519. Once the message is formatted at step 517, the message is sent to the Router Service 134 at step 521.

With continuing reference to FIG. 8, if the received message is not from a device (i.e., 503=NO), the method 500 will responsively determine if the message if from an application, i.e., by way of the Router Service 134. If the received message is not from a device (i.e., 503=NO) and is not from the Router Service 134 (i.e., 523=NO), the method 500 responsively generates a log exception, as indicated at step 513. However, if the received message is from the Router Service 134 (i.e., 523=YES), the method 500 continues to step 525, whereat the Processor Service 132 will determine processing information from the configuration schema of the message, and contemporaneously step 527, whereat the Processor Service 132 will determine connection information for the destination device. Next, at step 529, the Processor Service 132 determines if connection information for the destination device is available. If not (i.e., 529=NO), a log exception is generated by the method 500 at step 531. However, if the connection information for the destination device is available (i.e., 529=YES), the Processor Service 132 formats the application message with a disconnect flag at step 535, and sends the formatted message to the Dynamic Dispatcher Service 124 of the Message Broker module 120 at step 537.

As indicated at step 541 of FIG. 8, after data is extracted from the message payload at step 513, the Processor Service 132 determines if a connection is available for persisted messages to the device. If there is no connection available, the method 500 ends. Conversely, if a connection is available for the persisted messages, the Processor Service 132 will format the persisted messages at step 539 and, once properly formatted, sends the messages to the Dynamic Dispatcher Service 124. The method 500 may then return to step 501.

Figure 9:
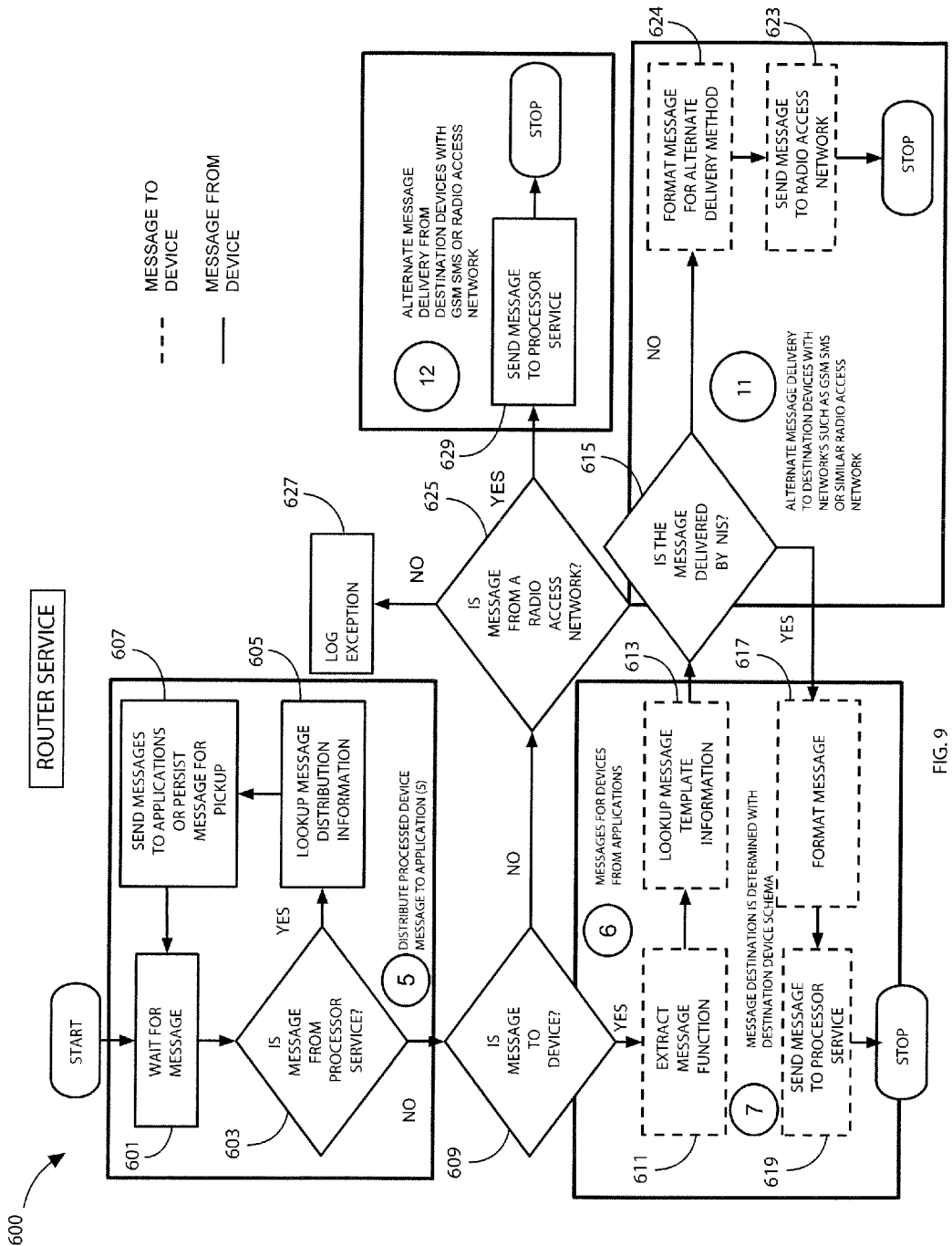
FIG. 9 is a flowchart for an exemplary router service module and corresponding method or algorithm that can correspond to instructions that can be stored on one or more non-transitory computer-readable media and can be executed by one or more controllers and/or processors which may be part of a computing network in accord with aspects of the disclosed concepts.

With reference now to the flowchart of FIG. 9, an improved method for distributing processed messages to applications, and for receiving messages from applications for devices, is generally described at 600 in accordance with aspects of the present disclosure. FIG. 9 can be representative of an algorithm that corresponds to at least some instructions that can be executed, for example, by the Router Service 134 of the Message Processor module 130 of FIG. 4 to perform the corresponding above- and below-described functions associated with the disclosed concepts. This flowchart helps to detail how the Router Service 134 listens for and routes device messages to subscribing applications, and also listens for and routes application messages for delivery to destination devices, as well as determining an acceptable method for delivering a message to a destination device.

The method 600 begins at step 601, which indicates that the Router Service 134 waits for a message. After a message has been received by the Router Service 134, step 603 includes determining if the received message is from the Processor Service 132. Responsive to the received message being from the Processor Service 132 (i.e., 603=YES), the Router Service 134 will determine the message distribution information for the processed message, as indicated at step 605. Once the message distribution information is identified, the Router Service 134 will distribute the message to the corresponding applications or persist the message for pickup, as indicated at step 607.

If the received message is not from the Processor Service 132 (i.e., 603=NO), the method 600 will responsively determine at step 609 if the message is intended for transmission to one or more devices. If so (i.e., 609=YES), the Router Service 134 will respond by extracting the message function at step 611 and determining the message's template information at step 613. The Router Service 134 will then determine, at step 615, if the message is delivered by the Network Services Interface (NIS) 122. If the message is to be delivered by the NIS 122 (i.e., 615=YES), the message is responsively formatted by the Router Service 134 at step 617, and subsequently sent to the Processor Service 132 at step 619. If the NIS 122 is not delivering the message (i.e., 615=NO), the method 600 will respond by the Router Service 134 formatting the message for alternative delivery method, as indicated at step 621, and subsequently sending the formatted message to the Radio Access Network 136, as indicated at step 623.

With continuing reference to FIG. 9, if the received message is not intended for transmission to one or more devices (i.e., 609=NO), the Router Service 134 will respond at step 625 by determining if the message is from the Radio Access Network 136. If the message is not from the Radio Access Network 136 (i.e., 625=NO) and is not intended for transmission to a device (i.e., 609=NO), the method 600 will responsively generate a log exception at step 627. If, however, the message is from the Radio Access Network 136 (i.e., 625=YES), the Router Service 134 send the message to the Processor Service 132 at step 629. The method 600 may then return to step 601.

An advantage of one or more of the disclosed embodiments is the reduction in time and expense that is required to adapt data transmission protocol to support changes in the customer businesses. For example, suppose a business model implements soil (pH) sensors with corresponding agents and soil temperature sensors with corresponding agents that communicate with a central control center via a computer network. If the business case changes requiring the addition of humidity sensors with corresponding agents or upgrades to the existing sensors/agents, or both, but the system is already in production, prior art solutions require the writing of all new agents (i.e., an entire set of compiled software code with a multitude of different functions). The new agents then need to be tested, must pass quality assurance protocols, and then must be passed into circulation, all of which is expensive and can become a very expensive problem. In accordance with one or more of the disclosed concepts, all that is required is the modification of an existing regular expression (e.g., a single line of code) which, in turn, reduces the time, expense, and the complexity to scale out the business model.

Another advantage accorded by one or more of the disclosed embodiments is the reduction in security vulnerabilities that are present in prior art solutions. In the prior art, it is required to write multiple agents of multiple heterogeneous devices, each of which has to run on a dedicated port. The more agents that are created, the more ports that must be opened on the server which concomitantly increases security vulnerability—each additional port is a vulnerability, a potential security breach. In at least some embodiments, the disclosed systems, methods and devices eliminate the requirement of software agents (subscriber software or device specific, or both). Some embodiments mitigate security vulnerability by restricting the operation ports on subscribers when communicating with multiple device types.

Aspects of this disclosure can be implemented, in some embodiments, through a computer-executable program of instructions, such as program modules, generally referred to as software applications or application programs executed by a computer. The software can include, in non-limiting examples, routines, programs, objects, components, and data structures that perform particular tasks or implement particular abstract data types. The software can form an interface to allow a computer to react according to a source of input. The software can also cooperate with other code segments to initiate a variety of tasks in response to data received in conjunction with the source of the received data. The software can be stored on any of a variety of memory media, such as CD-ROM, magnetic disk, bubble memory, and semiconductor memory (e.g., various types of RAM or ROM).

Moreover, aspects of the present disclosure can be practiced with a variety of computer-system and computer-network configurations, including hand-held devices, multiprocessor systems, microprocessor-based or programmable-consumer electronics, minicomputers, mainframe computers, and the like. In addition, aspects of the present disclosure can be practiced in distributed-computing environments where tasks are performed by remote-processing devices that are linked through a communications network. In a distributed-computing environment, program modules can be located in both local and remote computer-storage media including memory storage devices. Aspects of the present disclosure can therefore, be implemented in connection with various hardware, software or a combination thereof, in a computer system or other processing system.

Any of the methods described herein can include machine readable instructions for execution by: (a) a processor, (b) a controller, and/or (c) any other suitable processing device. Any algorithm, software, or method disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it can be implemented by an application specific integrated circuit (ASIC), a programmable logic device (PLD), a field programmable logic device (FPLD), discrete logic, etc.). Also, some or all of the machine readable instructions represented in any flowchart depicted herein can be implemented manually. Further, although specific algorithms are described with reference to flowcharts depicted herein, persons of ordinary skill in the art will readily appreciate that many other methods of implementing the example machine readable instructions can alternatively be used. For example, the order of execution of the blocks can be changed, and/or some of the blocks described can be changed, eliminated, or combined.

It should be noted that the algorithms illustrated and discussed herein as having various modules or blocks or steps that perform particular functions and interact with one another are provided purely for the sake of illustration and explanation. It should be understood that these modules are merely segregated based on their function for the sake of description and represent computer hardware and/or executable software code which can be stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

Any of the features, aspect and options disclosed in this document can be implemented, singly, collectively, or in any combination, into any of the disclosed embodiments.

While many embodiments and modes for carrying out the present invention have been described in detail above, those familiar with the art to which this invention relates will recognize various alternative designs and embodiments for practicing the invention within the scope of the appended claims.

What is claimed is:

1. A method for transferring information, over a data communication network, between one or more applications and multiple distinct types of devices operating multiple distinct application session protocols, the method comprising:
    communicating with a plurality of the devices, operating a plurality of the distinct application session protocols, over the data communication network;
    multiplexing a plurality of messages received from the plurality of devices, in accordance with the plurality of distinct application session protocols, such that the messages can be transmitted through a single operational port, the multiplexing including extracting, from a respective data payload of each of the received messages, the application session protocol for Transport Layer 4 to Application Layer 7 of the ISO stack;
    processing the multiplexed messages received from the plurality of devices utilizing a regular expression pattern matching logic to identify a pattern in the incoming application session protocols over one or more underlying transport protocols, the processing including generating, for each of the received messages, a new data payload with a logic expression formatted for transmission to at least one of the applications; and
    distributing the processed messages with the new data payloads to the at least one of the applications on the data communication network.

2. The method of claim 1, wherein the processing the multiplexed messages includes indexing the messages in a common format, and identifying service orchestration schema and message processing requirements of the indexed messages.

3. The method of claim 1, wherein the processing the multiplexed messages includes determining if the data payloads of the received messages correspond to the regular expression pattern being used to process the messages.

4. The method of claim 1, wherein the processing the multiplexed messages includes extracting data from the respective data payload of each of the messages, sending the extracted data to a context engine, and receiving from the context engine event data corresponding to the extracted data within a context relevance window.

5. The method of claim 1, further comprising:
    writing dynamic reconfigurable logic expressions for identifying patterns of incoming data from the multiple distinct types of devices on the data communication network,
    wherein the regular expression pattern matching logic utilized to process the multiplexed messages is part of at least one of the dynamic reconfigurable logic expressions defined in service orchestration schemas.

6. The method of claim 5, wherein the plurality of devices from which the messages are received includes a first distinct device type and a second distinct device type, and wherein a first distinct dynamic reconfigurable logic expression is generated for the first distinct device type and a second distinct dynamic reconfigurable logic expression is generated for the second distinct device type.

7. The method of claim 1, further comprising:
    identifying patterns of incoming data in the messages from the plurality of devices operating the plurality of the distinct application session protocols;
    matching the incoming data with one or more data structure templates to identify the application session protocols over the one or more underlying transport protocols; and
    extracting the matched data patterns for context analysis within a context relevance window.

8. The method of claim 1, wherein the multiplexing includes using service orchestration schemas or patterns, or both, to identify processing and routing requirements of the messages received from the devices.

9. The method of claim 1, wherein the multiplexing includes extracting the respective data payload from each of the messages received from the devices.

10. The method of claim 1, further comprising:
    persisting connection information from the messages received from the devices; and
    managing a connection state of the devices with a dynamically configurable data packet boundary.

11. The method of claim 1, wherein the communicating with the devices includes initiating a communication link with each of the devices over an internet protocol (IP) communication network and holding the communication link for a predetermined period of time.

12. The method of claim 1, further comprising determining for each of the messages received from the devices a message destination of a destination device and a method of delivery with destination device service orchestration schema.

13. The method of claim 12, further comprising determining a connection state of the destination device by querying connection information from a persisted connection database.

14. The method of claim 12, further comprising processing the messages received from the devices in accordance with the determined destination device schema.

15. A system for transferring information, over a data communication network, between one or more applications and numerous heterogeneous devices operating multiple distinct application session protocols, the system comprising:
- a network interface module operable to communicatively connect with and multiplex messages received from a plurality of the heterogeneous devices, each of the heterogeneous devices operating a respective one of the distinct application session protocols, the multiplexing including extracting, from a respective data payload of each of the received messages, the application session protocol for Transport Layer 4 to Application Layer 7 of the ISO stack;
- a dynamic dispatcher module communicatively coupled to the network interface module and operable to persist connection information from the heterogeneous devices and transmit the multiplexed messages through a single operational port;
- a processing module communicatively coupled to the dynamic dispatcher module and operable to process the multiplexed messages based on logic expressions using regular expression pattern matching to identify a pattern in the incoming application session protocols over one or more underlying transport protocols, the processing including generating, for each of the received messages, a new data payload with a logic expression formatted for transmission to the one or more applications; and
- a routing module communicatively coupled to the processing module and the one or more applications, the routing module being operable to determine message distribution information for each of the processed messages and to distribute each of the processed messages with the new data payloads to a corresponding one of the one or more applications.

16. The system of claim 15, wherein the processing the multiplexed messages includes indexing each of the multiplexed messages in a common format, and identifying service orchestration schema and executing services on the data communication network and message processing requirements for each of the indexed messages.

17. The system of claim 15, wherein the processing the multiplexed messages includes extracting data from the respective data payload of each of the multiplexed messages, sending the extracted data to a context engine, and receiving from the context engine event data corresponding to the extracted data.

18. The system of claim 15, wherein the processor module is further operable to identify patterns of incoming data in the messages from the numerous heterogeneous devices, and match the incoming data with one or more data structure templates to identify the application session protocols over the underlying transport protocols.

19. The system of claim 15, wherein the multiplexing includes using service orchestration schemas or patterns, or both, to deploy common services on the data communication network and identify processing and routing requirements of the messages received from the numerous heterogeneous devices.

20. A middleware server computer comprising:
- one or more server processors;
- one or more communication devices communicatively connecting at least one of the one or more server processors to multiple distinct devices over data communication network, the distinct devices operating multiple distinct application session protocols over multiple underlying transport protocols; and
- one or more memory storage devices storing instructions which, when executed by at least one of the one or more server processors, cause the one or more server processors to perform operations comprising:
  - receiving a plurality of messages from a plurality of the distinct devices over the data communication network, each of the distinct devices operating a respective one of the distinct application session protocols;
  - multiplexing the messages received from the distinct devices such that all of the messages can be transmitted through a single operational port, the multiplexing including extracting, from a respective data payload in each of the received messages, the application session protocol for Transport Layer 4 to Application Layer 7 of the ISO stack;
  - processing the multiplexed messages received from the distinct devices utilizing a regular expression pattern matching logic to identify a pattern in the incoming application session protocols over the underlying transport protocols, the processing including generating, for each of the received messages, a new data payload with a logic expression formatted for transmission to at least one of the applications; and
  - distributing the processed messages with the new data payloads to the at least one application via the data communication network.

* * * * *